United States Patent [19]

Healey et al.

[11] Patent Number: 4,952,010
[45] Date of Patent: Aug. 28, 1990

[54] OPTICAL SPACE SWITCH

[75] Inventors: Peter Healey, Ipswich; David W. Smith, Woodbridge, both of England

[73] Assignee: British Telecommunications public limited company, United Kingdom

[21] Appl. No.: 264,276
[22] PCT Filed: Feb. 18, 1988
[86] PCT No.: PCT/GB88/00102
  § 371 Date: Oct. 17, 1988
  § 102(e) Date: Oct. 17, 1988
[87] PCT Pub. No.: WO88/06393
  PCT Pub. Date: Aug. 25, 1988

[30] Foreign Application Priority Data

Feb. 20, 1987 [GB] United Kingdom ............... 8704016

[51] Int. Cl.$^5$ .............................................. G02B 5/32
[52] U.S. Cl. .................................. 350/3.77; 350/3.68; 350/3.73; 350/3.78; 350/96.15
[58] Field of Search ................... 350/3.67, 3.68, 3.7, 350/3.73, 3.75, 3.77, 3.78, 96.15, 96.19, 96.20; 370/1

[56] References Cited

U.S. PATENT DOCUMENTS

| | | | |
|---|---|---|---|
| 3,614,192 | 10/1971 | Preston, Jr. ......................... | 350/3.73 |
| 3,819,248 | 6/1974 | Takeda et al. ...................... | 350/3.68 |
| 3,985,975 | 10/1976 | Steensma ............................ | 350/3.68 |
| 4,062,618 | 12/1977 | Steensma ............................ | 350/3.68 |
| 4,120,569 | 10/1978 | Richards, Jr. ....................... | 350/3.68 |
| 4,543,662 | 9/1985 | Huignard et al. .................. | 350/3.62 |
| 4,653,849 | 3/1987 | Boirat et al. ....................... | 350/96.22 |
| 4,705,344 | 11/1987 | Hinton et al. ...................... | 350/3.73 |
| 4,824,192 | 4/1989 | Roberts ............................... | 350/3.73 |
| 4,830,444 | 5/1989 | Cloonan et al. ................... | 350/96.15 |
| 4,856,863 | 8/1980 | Sampsell et al. ................... | 350/96.2 |

FOREIGN PATENT DOCUMENTS

0161683 11/1985 European Pat. Off. .
2385266 10/1978 France .
85/04544 10/1985 PCT Int'l Appl. .

OTHER PUBLICATIONS

Krile et al., "Holographic Representations of Space-Variant System Using Phase-Coded Reference Beams": Applied Optics, Dec. 1977, vol. 16, No. 12, pp. 3131-3135.
LaMacchia et al., "Coded Multiple Exposure Holograms", Applied Optics, Jan. 1968. vol. 7, No. 1, pp. 91-94.
Soref, "Low-Cross Talk 2×2 Optical Switch", Optics Letter, vol. 6, No. 6, Jun. 1981, pp. 275-277.
Spanke, "Architectures for Large Non-Blocking Optical Space Switches"; IEEE Jounral of Quantum Electronics, vol. QE-22, No. 6, Jun. 1988, pp. 964-967.
Wagner et al., "Electrically Controlled Optical Switch for Multimode Fiber Applications", Applied Optics, vol. 19, No. 17, Sep. 1980, pp. 2921-2925.
A. Himeno et al.: "4×4 Opticalgate Matrix Switch", pp. 230-235, Journal of Lightwave Technology, vol. LT-3, No. 2, Apr. 1985, IEEEE.

(List continued on next page.)

Primary Examiner—Bruce Y. Arnold
Assistant Examiner—Terry S. Callaghan
Attorney, Agent, or Firm—Nixon & Vanderhye

[57] ABSTRACT

An optical space switch is used in a centralized switching system for an optical network and connects light from one of a number of inputs (1) to a selected one of a number of outputs (6). The switch includes a number of multiplexed phase volume holograms (4), a spatial light modulator (3) for imposing a selected phase change on light passing through it, distribution means (2) for coupling light from the inputs (1) via the spatial light modulator (3) to the multiplexed phase volume holograms (4), and collection means (5) for collecting light diffracted by the multiplexed phase volume holograms (4). Each multiplexed phase volume hologram (4) diffracts light to a selected output (6) in dependence upon the phase change imposed by the spatial light modulator (3) on the light incident upon that hologram (4).

19 Claims, 1 Drawing Sheet

OTHER PUBLICATIONS

R. A. Soref: "Electrooptic 4×4 Matrix Switch for Multimode Fiberoptic Systems", pp. 1386–1393, Applied Optics, vol. 21, No. 8, Apr. 1982, Optical Society of Amerca.

Proceedings of the European Conference on Optical Communication, Session A XIII: Systems (II), Sep. 22–24, 1982, (Cannes, FR).

J. P. Herriau et al., "Light Beam Steering Using a Reversible Photo–Induced Grating in B.S.O. Crystals", pp. 439–441, 2-14-83.

Proceedings of the International Switching Symposium, May 7–11, 1984, Florence, Session 41 A, paper 5, North–Holland Publ. Co., (Amsterdam, NL), P. Gravey et al.: "Optical Switching Technologies for High Capacity Exchanges", pp. 1–7, 3-8-85.

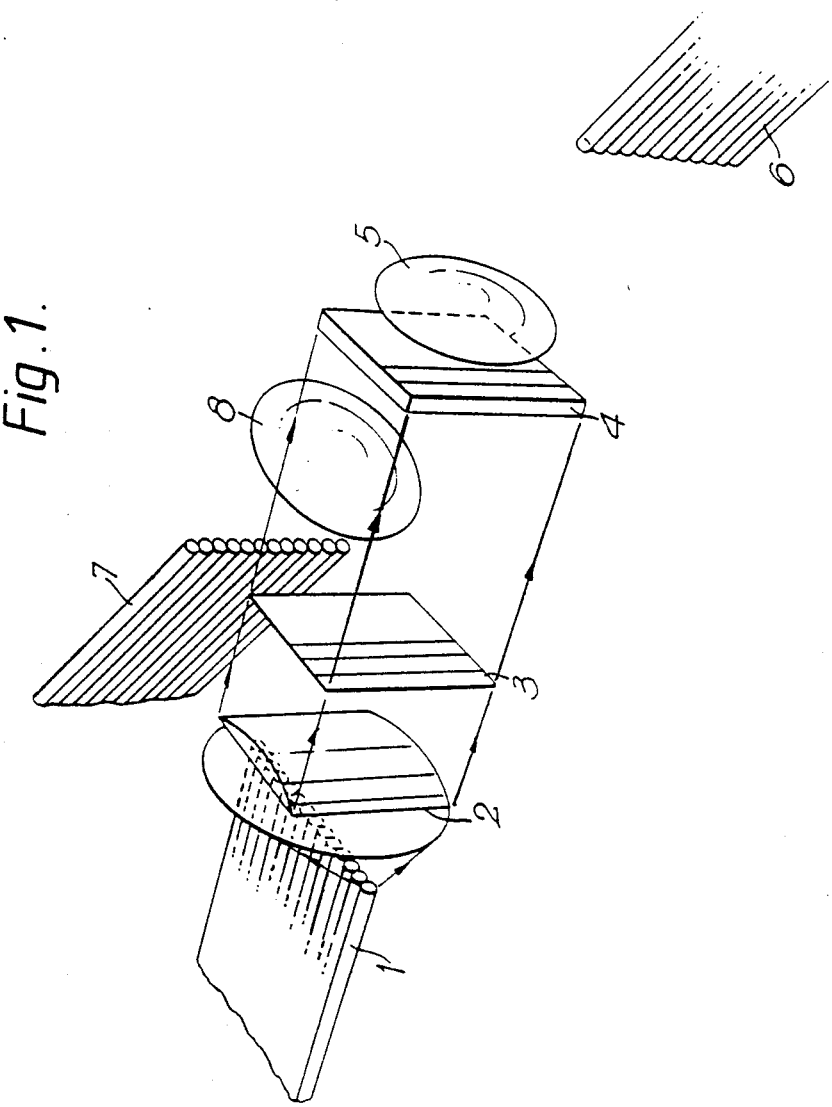

OPTICAL SPACE SWITCH

RELATED APPLICATION

This application is related to commonly assigned U.S. patent application Ser. No. 07/249,560, filed Sept. 23, 1988 for a BIDIRECTIONAL OPTICAL SPACE SWITCH naming Peter Healey as sole inventor now U.S. Pat. No. 4,923,269.

BACKGROUND OF THE INVENTION

This invention relates to an optical space switch which is capable of use in centralized switching system for an optical network. A centralized switching system is the simplest active network which is compatible with optical and electronic multiplexing, offers the maximum network size, range, and flexibility and is also compatible with the existing wire-network.

SUMMARY OF THE INVENTION

According to this invention an optical space switch for connecting light from one of a number of inputs to a selected one of a number of outputs includes a number of multiplexed phase volume holograms, a spatial light modulator for imposing a selected phase change on light passing through it, distribution means for coupling light from the inputs via the spatial light modulator to the multiplexed phase volume holograms, and collection means for collecting light diffracted by the multiplexed phase volume holograms, each multiplexed phase volume hologram diffracting light to a selected output in dependence upon the phase change imposed by the spatial light modulator on the light incident upon that hologram.

Preferably there are the same number of multiplexed phase volume holograms as there are inputs and the same number of holograms in each multiplexed phase volume hologram as there are outputs and the distribution means couples light from each input via the spatial light modulator to its respective multiplexed phase volume hologram and the collection means collects the light diffracted by the multiplexed phase volume holograms and applies it to its respective output. This arrangement provides total flexibility and enables each and every input to be coupled to each and every output. However, in some circumstances it is desirable to be able to arrange for two inputs to be switched together by the optical switch or, for example, two outputs to receive the same signal. In this case, there may be fewer multiplexed phase volume holograms than there are inputs and greater numbers of holograms in each multiple of phase volume hologram than there are outputs. The distribution and collection means are formed by lenses or holograms arranged to couple light emitted from a particular input to a particular multiplexed phase volume hologram via the spatial light modulator and arranged to receive light diffracted by the multiplexed phase volume holograms and couple it to the individual outputs.

The inputs may be provided by the ends of a number of optical fibre waveguides, or, alternatively, the inputs may be formed by a number of optical devices the outputs of which are modulated by the input signals. Thus, the optical inputs may all be taken from a single optical source which is split and each split component modulated in accordance with an input signal, or alternatively, the devices may be formed by a number of independent optical sources each of which is modulated in accordance with an input signal. The outputs may be formed by the ends of an array of optical waveguides leading away from the optical space switch and, in this case they are preferably formed by an array of multimode optical fibres. Alternatively, the outputs may be formed by an array of photo detectors or other active devices such as self electrooptic effect devices which detect, amplify, or regenerate the light received. Photodetectors may form part of an optical regenerator which, in turn, generates an output in the form of an optical signal. The input may be arranged in a linear array and, in this case the output may also be arranged as a linear array extending in a direction perpendicular to that of the linear input array. Alternatively, the input and/or outputs may have the form of two dimensional matrix arrays.

The spatial light modulator may be formed by a material the refractive index of which may be varied by the application of an electrical or optical signal or it may be formed from a material the physical dimensions of which can be changed selectively by the application of an electrical signal. In either case the change of phase across the wavefront of light passing the spatial light modulator can be varied by the selective application of an electrical or optical control signal to the spatial light modulator Examples of spatial light modulators are acousto-optic transducers and liquid crystals. Individual spatial light modulators may be provided to modulate the light emitted by each input or, alternatively, a single spatial light modulator may be provided which interacts with light from all of the inputs.

The multiplexed phase volume holograms may be reflection or transmission holograms or may be mixtures of both reflection and transmission holograms. The holograms may also be of the Fourier transform phase volume hologram type.

To create the multiplexed phase volume holograms an unexposed holographic recording medium is placed in position downstream of the inputs, which during creation of the holograms act as reference sources, the distribution means and the spatial light modulators. An object array corresponding to the output and collection means are located on the same side of the holographic recording medium as the input distribution means and spatial light modulator and in a laterally offset position when creating a transmission hologram. Light from a coherent source, typically a laser is applied via one of the inputs, the distribution means and the spatial light modulator to form a reference beam which impinges upon a section of the holographic recording medium which receives light from that input. Another beam taken from the same coherent light source and passing through an equivalent path length is applied via one of the objects, typically the output end of a single mode optical fibre waveguide which then, after passage through lenses forming the collection means is distributed over the same section of the surface of the holographic recording medium. Light from the same source but which has passed through these two different paths then interferes in the volume of the holographic recording medium to expose a particular pattern in that section of the holographic recording medium. Then, light is emitted from a different object and a different control signal is applied to the spatial light modulator. A further exposure of that section of the holographic recording medium is then made to expose a second pattern. This process is repeated until a pattern is exposed for each of the object sources, each one having a different control signal applied to the spatial light modulator so that the reference beam used to create the hologram has a different phase front. Thus, each reference and point source are stored in association with one another.

The next section of the holographic recording medium which receives light from the next input is then exposed by applying the reference beam to the next input and making another series of exposures with each and every object and with different control signals applied to the spatial light modulator. This process is repeated with a reference beam being applied to each and every input until the entire holographic recording medium has been exposed. The recording medium is then processed to produce the multiplexed phase volume holograms.

Thus, with this system when light from a particular input passes via the spatial light modulator to its multiplexed phase volume hologram since the light from the input forms a reconstruction beam following the path of the reference beam a virtual image is formed at the location of the object and the collection means focuses light diffracted by the hologram onto the corresponding output in dependence upon the control signal that is applied to the spatial light modulator. The light diffracted by the multiplexed phase volume hologram. The collection means focuses the light diffracted by the hologram corresponding to the required virtual image on to the output while the light diffracted by other holograms are widely dispersed over the output plane. In principle, the light dispersed from the other holograms can be made orthogonal at the point of focus on the output plane by using an orthogonal function in the spatial encoding process of the reference waves e.g. Walsh or Hadamard functions. Since the diffraction efficiency of the individual holograms falls as the number of holograms in each multiplexed phase volume hologram is increased and the power of the light incident upon the hologram is shared between the multiple diffractions the switch insertion loss grows rapidly with increasing numbers of outputs. This low can be minimised in a volume phase hologram by maximizing the angular separation between the object point sources, and hence between the outputs so that the Bragg extinction angle eliminates most of the undesired interference terms. In practice, it is possible to superimpose more than one thousand holograms of coded individual point sources on a single multiplexed hologram and it is believed that two or three orders greater than this may be possible.

BRIEF DESCRIPTION OF THE DRAWING

A particular example of an optical switch in accordance with this invention will now be described with reference to the accompanying drawing of FIG. 1 which is a diagrammatic perspective view.

DETAILED DESCRIPTION OF AN EXEMPLARY EMBODIMENT

The optical switch comprises a number of inputs formed by a linear array of single mode optical fibres 1, a spherical and cylindrical lens combination 2, a spatial light modulator 3, a number of multiplexed phase volume holograms 4, a lens combination 5, and a linear array of multimode optical fibres 6 forming a number of outputs. The spherical and cylindrical lens combination 2 spreads light leaving the end of the input fibres 1 in the vertical direction as shown in the drawing to spread it over a vertical column of the spatial light modulator 3 and a similar vertical column of the hologram 4. The hologram 4 is formed by a number of vertical sections arranged side-by-side. The sections are associated with the individual input fibres 1 and light from the first input fibre is only incident upon the first section. The spatial light modulator 3 equally includes a number of vertical sections with each section only receiving light from its corresponding input fibre. The spatial light modulator 3 is formed by an acousto-optic modulator. A separate control signal is applied to each of these sections to vary the phase change that occurs on passage of light through the section of the spatial light modulator 3. The multiplexed phase volume holograms that are recorded in each section of the hologram 4 diffract the light passing through the hologram 4 in such a way that it is focused by the lens 5 onto one of the output fibres 6. Which of the output fibres 6 the light is focused upon is determined by the phase front that is imposed on the light as it passes through the spatial light modulator 3. Thus, by varying the control signal applied to the individual sections of the spatial light modulator 3 the input signal appearing on each input fibre 1 is coupled to a particular individual output fibre 6.

To create the holograms a holographic recording medium 4' is located where the hologram 4 is located and a number of object sources formed by the ends of a linear array of single mode optical fibres 7 are provided. The object sources 7 are complementary to output fibre 6 and may include a similar optical system 8 but the object fibres 7 are located on the same side of the holographic recording medium 4' as the input fibres 1. To record the holograms on the medium 4' a single coherent optical source (not shown) typically formed by a laser is applied via a beam splitter to one of the input fibres 1 and also to a selected object fibre 7. When the coherent source is applied to the first input fibre 1 a first strip of the medium 4' is uncovered, a first control signal is applied to the spatial light modulator 3, and the coherent light is also applied to one of the object fibres 7. Thus, coherent light from the coherent light source is fed firstly via one of the fibres 1, the lens system 2 and the spatial light modulator 3 and, independently, via one of the object fibres 7 and the lens system 8 and both of these beams interfere with one another in the first section of the holographic recording medium 4'. This exposes a first pattern in the first section of the medium 4'. Then, a second control signal is applied to the first section of the spatial light modulator 3 and the light from the coherent light source is then fed to the second object fibre 7 as well as the first input fibre 1. Another exposure is made of the first section of the holographic recording medium 4' and this process is repeated until a pattern is recorded in the first section of the holographic recording medium 4' for each one of the object fibres, each time a different control signal being applied to the first section of the spatial light modulator 3. Then, the coherent light source is applied to the second one of the input fibres 1, a first control signal is applied to the second section of the spatial light modulator 3 and the first section of the holographic recording medium 4' is covered up and a second section exposed. The process is repeated until all of the patterns are exposed on the second section of the holographic recording medium 4'. This process is continued to expose as many sections across the holographic recording medium 4' as there are input fibres 1. The holographic recording medium 4' is then processed in the conventional way to produce the required multiplexed phase volume holograms 4.

In preparing the holographic recording medium 4' the light from the input fibres 1 and which has passed through the spatial light modulator 3 forms the reference beam and the light from the fibres 7 forms the object. Thus, when the developed hologram 4 is illuminated by light from a source of substantially the same wavelength as the coherent light used to prepare the hologram 4, the light diffracted by the hologram 4 appears to have come from a virtual image located at the position of the object fibre 7. This light is thus focused by the optical system 5 on to one of the output fibres 6. Since a different control signal was applied to the spatial light modulator 3 when different object fibres 7 were illuminated and used as objects during the construction of the hologram, by applying particular control signals to the spatial light modulator 3 when input signals are fed from the input fibres 1 these are switched by the hologram 4 to particular of the output fibre 6 corresponding to the object fibre 7.

We claim:

1. An optical space switch for connecting light from each of two or more inputs to a selected one of a number of outputs including:
    a number of multiplexed phase volume holograms one corresponding to each of said inputs, and each multiplexed phase volume hologram including a superposition of a plurality of phase volume holograms, each of which corresponds to one of said outputs,
    a spatial light modulator for imposing a selected phase change on light passing through it,
    distribution means for coupling light from the inputs via the spatial light modulator to the multiplexed phase volume holograms, and
    collection means for collecting light diffracted by the multiplexed phase volume holograms,
    each multiplexed phase volume hologram diffracting light to a selected output in dependence upon the phase change imposed by the spatial light modulator on the light incident upon that hologram.

2. An optical space switch according to claim 1, in which there are the same number of multiplexed phase volume holograms as there are inputs and the same number of holograms in each multiplexed phase volume hologram as there are outputs and the distribution means couples light from each input via the spatial light modulator to its respective multiplexed phase volume hologram and the collection means collects the light diffracted by the multiplexed phase volume holograms and applies it to its respective output.

3. An optical space switch according to claim 1, in which the distribution and collection means are formed by lenses or holograms arranged to couple light emitted from a particular input to a particular multiplexed phase volume hologram via the spatial light modulator and arranged to receive light diffracted by the multiplexed phase volume holograms and couple it to the individual outputs.

4. An optical space switch according to claim 1, 2 or 3, in which the inputs are provided by the ends of a number of optical fibre waveguides.

5. An optical space switch according to claim 1, 2 or 3, in which the inputs are formed by a number of optical devices, the outputs of which are modulated by input signals.

6. An optical space switch according to claim 5, in which the optical inputs are all taken from a single optical source which is split and each split component modulated in accordance with an input signal.

7. An optical space switch according to claim 5, in which the optical devices are formed by a number of independent optical sources each of which is modulated in accordance with an input signal.

8. An optical space switch according to claim 1, 2 or 3, in which the outputs are formed by the ends of an array of multimode optical waveguides leading away from the optical space switch.

9. An optical space switch according to claim 1, 2 or 3, in which the outputs are formed by an array of photodetectors or other active devices.

10. An optical space switch according to claim 1, 2 or 3, in which the inputs are arranged in a linear array and, the outputs are also arranged as a linear array extending in a direction perpendicular to that of the linear input array.

11. An optical space switch according to claim 1, 2 or 3, in which the inputs and/or outputs have the form of a two dimensional matrix array.

12. An optical space switch according to claim 1, 2 or 3, in which the spatial light modulator is formed by a material having a refractive index which may be varied by the application of an electrical or optical signal.

13. An optical space switch according to claim 1, 2 or 3, in which the multiplexed phase volume holograms are transmission holograms.

14. An optical space switch comprising:
    a first array of optical signal ports;
    a second array of optical signal ports;
    an array of prerecorded holograms optically coupled to and between said first and second arrays of optical signal ports, each of said holograms including a multiplexed plurality of superpositioned phase volume holograms collectively representing the potential optical connections between a given one of said optical signal ports of said first array and each of a corresponding plurality of others of said optical signal ports; and
    an array of individually controllable optical phase shifters disposed between said first array of optical signal ports and said array of holograms, each individual phase shifter optically coupling one of the optical signal ports of said first array with one of the holograms.

15. An optical space switch as in claim 14 wherein said first and second arrays are each linear arrays oriented perpendicularly with respect to each other.

16. An optical space switch as in claim 15 wherein said array of holograms comprises a series of substantially co-planar side-by-side strips, each such strip including one of said holograms.

17. An optical space switch as in claim 16 wherein said array of phase shifters comprises a series of substantially co-planar side-by-side strips, each such strip including one of said phase shifters and being optically aligned with a corresponding strip of the array of holograms.

18. An optical space switch as in claim 17 wherein said array of phase shifters includes spherical and cylindrical optical lenses arranged to couple light associated with a given one of the optical signal ports of said first array to substantially the entirety of a corresponding single strip of the array of phase shifters.

19. An optical space switch as in claim 14 including a third array of optical signal ports disposed complementary to said second array and optically coupled to the space normally occupied by said array of holograms for use in creating said array of hologram in a recording medium.

* * * * *